United States Patent [19]

Safinya

[11] Patent Number: 4,603,297
[45] Date of Patent: Jul. 29, 1986

[54] LOGGING DEVICE LOADED WITH DIELECTRIC MATERIAL TO MINIMIZE SPURIOUS TRANSVERSE MAGNETIC MODE COMPONENTS

[75] Inventor: Kambiz A. Safinya, Ridgefield, Conn.

[73] Assignee: Schlumberger Technology Corporation, New York, N.Y.

[21] Appl. No.: 525,770

[22] Filed: Aug. 23, 1983

[51] Int. Cl.$^4$ .............................................. G01V 3/30
[52] U.S. Cl. .................................... 324/338; 324/341
[58] Field of Search .................... 324/338, 339, 341

[56] References Cited

U.S. PATENT DOCUMENTS

| | | | |
|---|---|---|---|
| 3,249,858 | 5/1966 | Gouilloud | 324/339 |
| 3,403,328 | 9/1968 | Fossati et al. | 324/338 |
| 4,209,747 | 6/1980 | Huchital et al. | 324/338 |
| 4,401,947 | 8/1983 | Cox | 324/338 |
| 4,451,789 | 5/1984 | Meador | 324/338 |
| 4,461,997 | 7/1984 | Ohmer | 324/338 |

Primary Examiner—Gerard R. Strecker
Attorney, Agent, or Firm—Stephen L. Borst; Martin M. Novack

[57] ABSTRACT

The disclosure is applicable to a borehole logging device of the type which includes an elongated body suspendable in a borehole and having at least one transmitting antenna and at least one receiving antenna mounted in spaced relation in the body. Energizing signals are applied to the transmitting antenna to produce electromagnetic energy, a portion of which is received at the receiving antenna after being affected by earth formations surrounding the borehole. In accordance with the disclosed invention, a region of the body is loaded with a dielectric material having a dielectric constant selected to minimize, at the receiving antenna, the effect of spurious transverse magnetic mode components of standing wave electromagnetic energy within the body. Preferably, the dielectric material is selected to have a dielectric constant which adjusts the wavelength of the spurious transverse magnetic mode components of standing wave electromagnetic energy such that the standing wave has substantially a minimum amplitude at the receiving antenna. In an illustrated embodiment, a dielectric material is loaded in the region between the receiving antenna and a conductive end cap proximate thereto and also in the region between the transmitting antenna and the end cap proximate thereto, and a lossy dielectric material is loaded in the region between the transmitting antenna and the receiving antenna.

21 Claims, 8 Drawing Figures

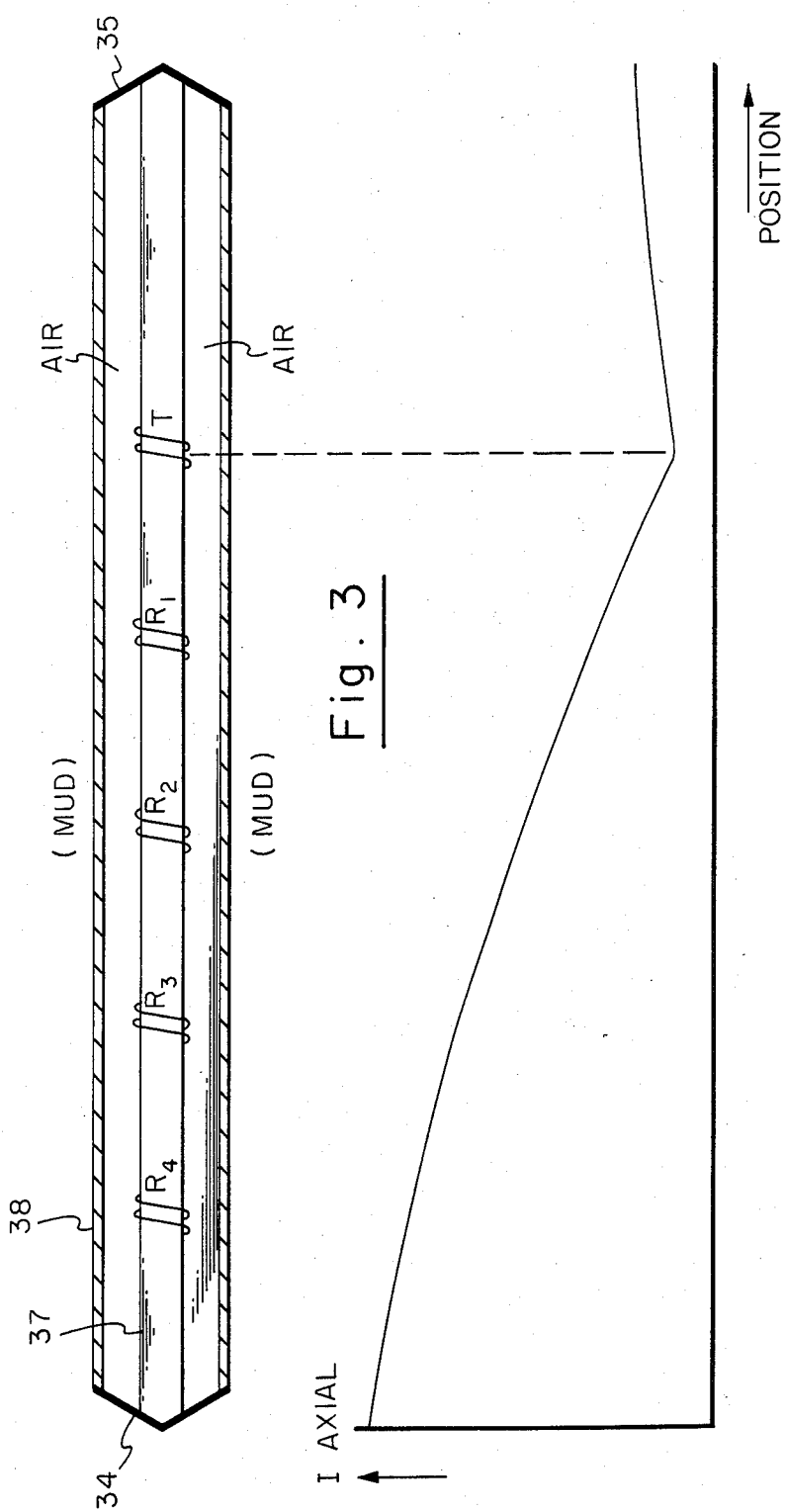

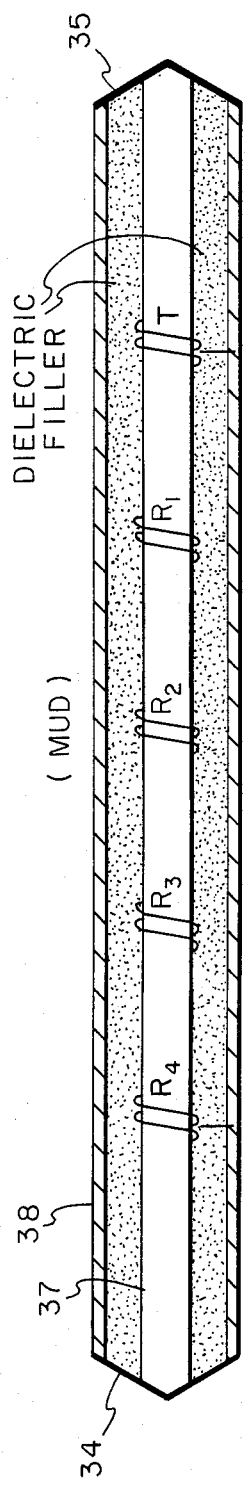
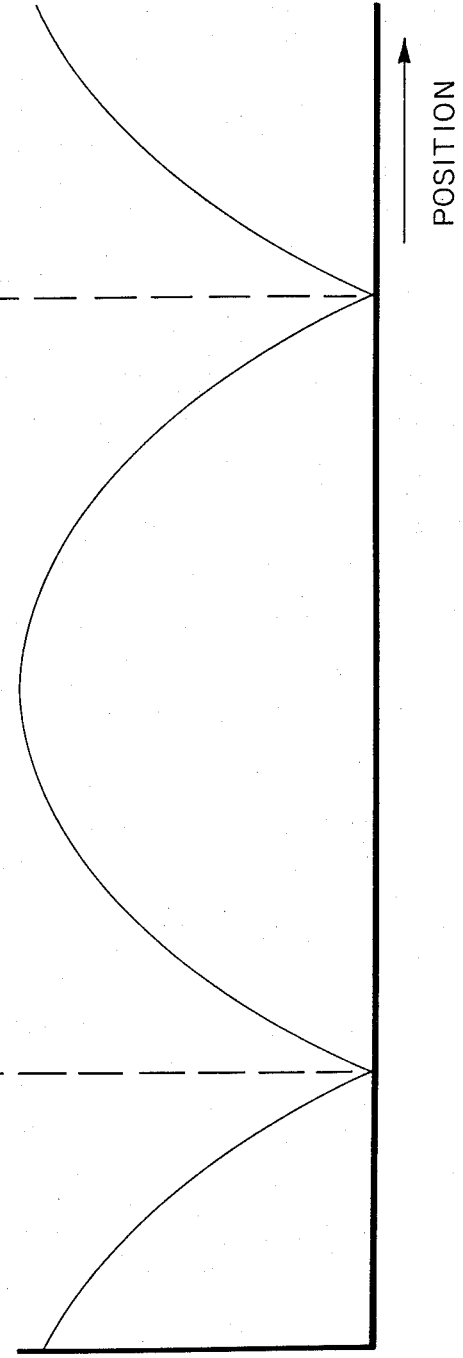
Fig. 5
Fig. 6

LOGGING DEVICE LOADED WITH DIELECTRIC MATERIAL TO MINIMIZE SPURIOUS TRANSVERSE MAGNETIC MODE COMPONENTS

BACKGROUND OF THE INVENTION

This invention relates to borehole logging devices of the type wherein electromagnetic energy is used for measuring properties of formations surrounding a borehole and, more particularly, to improvements in such devices to reduce the effect of spurious modes of the electromagnetic energy.

Induction logging has been employed for many years for measuring the conductivity of subsurface earth formations surrounding an earth borehole. In conventional induction logging a number of coils are wound on a mandrel. One or more transmitter coils are energized by an alternating current at a frequency such as 20 KHz. The resultant oscillating magnetic field causes induction of circulating currents in the formations which are substantially proportional to its conductivity. These currents, in turn, cause a voltage to be induced in receiver coils, and the conductivity of the formations is determined from the induced voltage. Spurious modes of electromagnetic energy can arise and cause problems in conventional induction logging, but such problems are considerably more pronounced in logging devices operating at higher frequencies.

In recent years logging systems have been proposed for employing radio frequency electromagnetic energy in the range between about 10 MHz and 100 MHz to determine both the dielectric constant and the conductivity of formations surrounding a borehole. In this frequency range, dielectric constant and conductivity both have a substantial effect upon the propagation constant of electromagnetic energy propagating in the formations, so measurements of attenuation and phase can be used for solution of simultaneous equations to determine the dielectric constant and/or conductivity of formations through which the electromagnetic energy has passed. A device of this type is the so-called deep propagation tool, an embodiment of which is described in U.S. Pat. No. 4,209,747. This device includes a transmitting antenna, a "close" receiver antenna pair, and a "far" receiver antenna pair. Each of the transmitter and receiver antennas are coils wound in insulating media mounted on a metal cylindrical pipe which carries wiring to and/or from the coils. Metal "end caps" are generally provided at the opposing ends of the device. Briefly, operation of the deep propagation logging device involves energizing the transmitter to emit electromagnetic energy at a frequency suitable for determination of both the electrical conductivity and the electrical permittivity of the surrounding formations. A portion of the electromagnetic energy which has traveled through the formations is received at the close and far differential receiver pairs. The signals detected at the far receiver pair are used to determine the phase shift of electromagnetic energy that has passed through the formations, and the signals detected at the close receiver pair are used to determine relative attenuation of the electromagnetic energy. The phase shift and attenuation are then employed to obtain electrical permittivity and electrical conductivity of the formations.

The relatively high frequency electromagnetic energy that is used to obtain the substantial displacement currents needed to measure dielectric properties of the formations attenuates quickly as it travels through the formations. The receivers are typically spaced a substantial distance from the transmitter to obtain a significant depth of investigation into the formations. Accordingly, the signal levels received at the receivers (particularly the more distant of the far receiver pair) tend to be weak, especially in relatively conductive (lossy) formations. Since it is necessary to obtain accurate measurements of the relative attenuation and phase at the receivers, it is desirable to have the signal-to-noise ratio at said receivers be as high as possible. When the received signal is weak, however, as is often the case, the amount of spurious or interfering signal (i.e., "noise") is a limiting factor on the measurement accuracy of the logging device.

It is an object of the present invention to improve operation in the described type of logging devices, and in induction logging devices in general, by substantially reducing deleterious noise effects.

SUMMARY OF THE INVENTION

There are various phenomena which cause noise at the receivers of electromagnetic logging devices, but a particularly important interfering signal in a deep propagation type of logging device results from certain electromagnetic energy in the region between the central metal pipe of the device and conductive borehole fluid. The troublesome energy in this region has a predominant transverse magnetic component that can be envisioned as being similar to the energy in a coaxial type of transmission line or cavity. To picture this energy mode, the metal cylindrical pipe of the logging device can be thought of as the central conductor of a coaxial line, and the relatively conductive borehole fluid can be thought of as the outer cylindrical conductor of the coax. Depending upon the relative conductivity of the outer "conductor" in the coaxial cavity model (i.e., the borehole fluid, the mudcake, or the formations, as the case may be), the spurious noise mode may comprise different types of electromagnetic waves having a predominant transverse magnetic component; e.g. transverse magnetic ("TM") mode electromagnetic waves that include both radial and axial electric field components, and an azimuthal magnetic field component. The noise modes having a predominant transverse magnetic component (i.e., both TEM and TM type modes) will be referred to herein as transverse magnetic modes or components. If metal end caps are used, the inner and outer conductors of the model are effectively shorted together, and the logging device is roughly analagous to a coaxial cavity in which standing wave energy can be established.

If the transmitter and receiver coils were perfectly configured and balanced in a theoretically ideal system, the electromagnetic wave energy generated by the coils would be transverse electric ("TE") mode, of the type generated by an ideal vertical magnetic dipole. However, under actual operating circumstances there is sufficient misalignment, unbalance, or other conditions that give rise to significant undesired transverse magnetic mode. As described hereinabove, the logging device itself in the borehole can act as a coaxial cavity for transverse magnetic wave energy which can thereby be established as standing wave energy which adversely affects operation.

The present invention is applicable to a borehole logging device of the type which includes an elongated body suspendable in a borehole and having at least one transmitting antenna and at least one receiving antenna mounted in spaced relation in the body. Means are provided for applying energizing signals to the transmitting antenna to produce electromagnetic energy, a portion of which is received at the receiving antenna after being affected by earth formations surrounding the borehole. In accordance with the improvement of the invention, a region of the body is loaded with a dielectric material having a dielectric constant selected to minimize at said receiving antenna the effect of spurious transverse magnetic mode components of standing wave electromagnetic energy within the body. Preferably, the dielectric material is selected to have a dielectric constant which adjusts the wavelength of the spurious transverse magnetic mode components of standing wave electromagnetic energy such that the standing wave has substantially a minimum amplitude at the receiving antenna.

Typically, the logging device will have an elongated central conductor (which is analagous to the central conductor of a coaxial cavity model) and metal end caps, which "short" a conductive borehole fluid (which is analagous to the outer conductor of a coaxial cavity model) to the central conductor. Ideally, the wavelength in the dielectric material loaded in the region between the receiving antenna and the end cap closest thereto should be approximately four times the distance between the receiving antenna and said end cap. This will result in an approximate minimum of the spurious standing wave electromagnetic energy at the receiving antenna, since the receiving antenna will be at approximately a quarter wavelength distance (for the wavelength as measured in the dielectric material) from the conductive end cap at which the transverse magnetic component is at an approximate maximum. Additional portions of the logging device body can be loaded with one or more dielectric materials that have further beneficial effect on operation, including reducing the effective amplitude of the spurious mode transverse magnetic electromagnetic energy at other important locations, such as at other receiving antennas or the transmitting antenna. Applicant has found that the use of a lossy dielectric in other regions can have additional beneficial effect.

In an illustrated embodiment hereof, the principles of the invention are applied to the type of logging device of the kind disclosed in U.S. Pat. No. 4,209,747, and which has conductive end caps that serve to "short" the ends of a coaxial cavity model in a substantially conductive borehole fluid environment. In such a device, a transmitter is utilized in conjunction with a close receiver pair and a far receiver pair, and the dielectric material loaded in the region between the most remote receiver and the conductive end cap closest thereto is selected as having a dielectric constant in accordance with the previously described principles. For a device of this type having, for example, an operating frequency of 25 MHZ, and a distance between the most remote receiver and the end cap proximate thereto of about 0.5 meters, the dielectric constant for the dielectric material loaded in the region between said receiver and end cap would ideally have a dielectric constant of about 36. However, it will be understood that there may be difficulty providing, at practical cost, dielectric materials having dielectric constants that are at or very near a given ideal value. In the described device, a dielectric constant greater than about 20 will provide substantial performance improvement. A suitable dielectric material having a dielectric constant of about 30, which provides very substantial improvement, is available. In this embodiment, an advantageous result was also obtained by employing a high dielectric constant material in the region between the transmitter and its proximate end cap, and by employing a lossy dielectric material in the region between the transmitter and the farthest receiver.

Further features and advantages of the invention will become more readily apparent from the following detailed description when taken in conjunction with the accompanying drawings.

BRIEF DESCRIPTION OF THE DRAWINGS

FIG. 3 is a simplified diagram of an air-filled logging device.

FIG. 4 is a graph of axial current for the device of FIG. 3.

FIG. 5 is a simpliied diagram of a logging device filled with a dielectric material.

FIG. 6 is a graph of the axial current of the FIG. 5 device.

DESCRIPTION OF THE PREFERRED EMBODIMENTS

Figure 1:
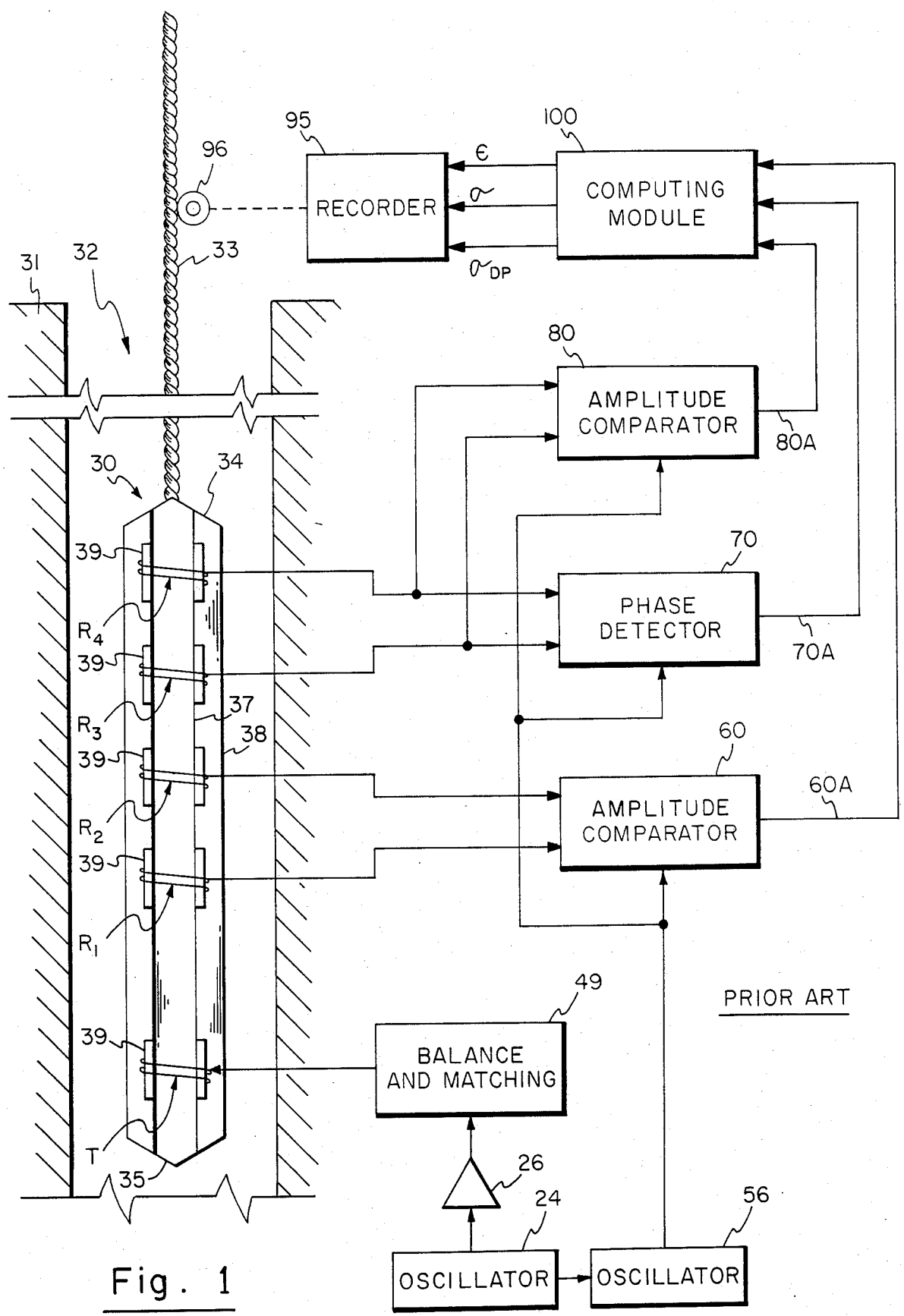
FIG. 1 is a block diagram, partially in schematic form, of a prior art apparatus of a type in which the improvement of the present invention can be employed.

Referring to FIG. 1, there is shown a representative embodiment of a prior art apparatus for investigating subsurface formations 31 traversed by a borehole 32. The borehole 32 may be filled with air or, more typically, a drilling mud. (The invention has application for use in the various borehole fluids, but is particularly useful when the borehole fluid is relatively conductive.) Also, the borehole may be open or cased with a nonconductive material. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The armored cable 33 is rewound on the drum to raise the device 30 toward the surface as formation characteristics are measured. Depth measurements are provided by a measure wheel 96 which is rotated as a result of contact with cable 33. Pulses provided by rotation of measure wheel 96 are applied to a recorder to provide a record of the depths at which measurements are being taken.

The logging device 30 is generally of the type described in U.S. Pat. No. 4,209,747 in that it includes a transmitter coil T, a pair of "close" receiver coils R1 and R2, and a pair of "far" receiver coils R3 and R4. The coils are wound in ceramic media 39 that is mounted on a metal cylindrical pipe 37 which carries wires to and/or from the coils and may also contain electronic components of the logging device. The pipe 37 helps prevent interference at the coils from the wires and/or components therein. An outer insulating pressure-tight housing 38 contains the portions of the device already described. Metal end caps 34 and 35 are provided at the respective ends of logging device 30 to provide structural integrity and to serve as mating connectors to other subs (e.g. power supplies or telemetry devices - not shown) of the downhole unit.

The transmitter T is driven by a circuit which includes an oscillator 24 that generates a radio frequency signal in the range of 10 MHz-100 MHz. The output of oscillator 24 is amplified by amplifier 26 and then coupled to the transmitter T via a balance and matching network 49. An oscillator 56, which is synchronized with oscillator 24, provides an output signal having a frequency which differs from the frequency of signals provided by oscillator 24 by a relatively low frequency. The output of oscillator 56 is mixed with the signals from the receivers to generate a further signal having a phase and amplitude related to the phase and amplitude of the receiver outputs but a much lower frequency which simplifies the amplitude and phase detection operations.

An amplitude comparator circuit 60 functions to measure the relative attenuation of electromagnetic wave energy detected at the receivers R1 and R2 and provides an amplitude ratio signal A2/A1 where A2 and A1 are peak amplitudes sensed at the receivers R2 and R1 respectively. A phase detector circuit 70 functions to measure the difference in phase between electromagnetic waves detected at receivers R3 and R4. The outputs of receivers R3 and R4 may also be applied to a second amplitude comparator circuit 80 which is used in deriving a "ultra-deep conductivity" measurement.

For ease of illustration, the described transmitter and receiver circuitry are illustrated as being set apart from device 30, although such circuitry is generally located within the logging device. The circuitry is electrically coupled to surface instrumentation, including a computing module 100, through conductors 60A, 70A and 80A which are included within the armored cable 33.

The computing module 100 combines the relative attenuation signal provided by amplitude comparator 60 and the phase difference signal provided by phase detector 70 to derive dielectric constant and conductivity values for the formations at a particular depth of investigation. Also, the output signal of amplitude comparator 80 can be combined with the derived dielectric constant value to obtain an ultra-deep conductivity value for the formations. The calculated values of dielectric constant and conductivity are applied to a recorder 95 which also receives depth indicating signals from the measure wheel 96. The recorder provides a loof dielectric constant values and conductivity values for the formations surrounding the borehole as a function of depth.

Figure 2:
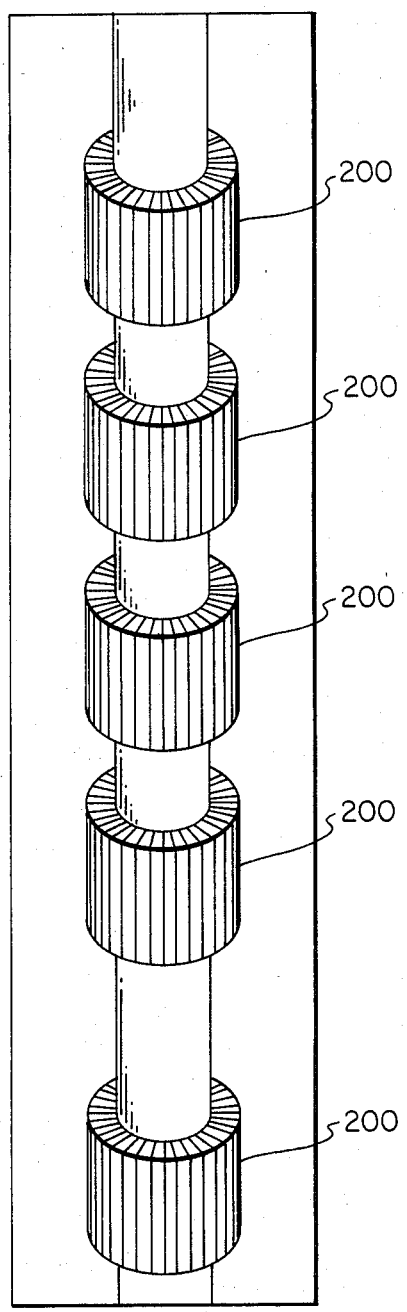
FIG. 2 illustrates the logging device of the FIG. 1 apparatus, employing antenna shields.

The spurious electromagnetic energy within the logging device of FIG. 1 can be visualized by comparing the device in a borehole to a coaxial cavity. The central metallic pipe 37 of the device, which houses cables and, if desired, electronic circuitry, acts like the center conductor of a coaxial line, and the conductive borehole mud and/or formations act like the outer conductor. Since the pressure housing 38 defines an electrically insulating enclosure, it can be considered as analagous to the air or dielectric filling of the coax. As a result, the device/borehole system supports a set of electromagnetic modes similar to those of a coaxial transmission line, particularly a coaxial transverse magnetic mode $TM_{oo}$. The metal end caps 34 and 35 tend to short the inner and outer "conductors" of the model, so the device behaves as a coaxial cavity. The magnetic and electric fields associated with the $TM_{00}$ mode are not constant along the length of the sonde, but have minima and maxima in their patterns. The location and size of these minima and maxima depend upon the length of the device, the position of the transmitter T, and the dielectric constant(s) of the material(s) within the sonde. If antenna shields are employed, as described in copending U.S. application Ser. No. 368,922 filed Apr. 16, 1982, now U.S. Pat. No. 4,536,714, (and illustrated in FIG. 2 by a shield 200 around each antenna), a shielded antenna couples to the $TM_{00}$ mode only via the magnetic field (or the axial current) of the mode, and one can disregard the electric field pattern. The receiver R4 that is farthest from the transmitter is most adversely effected by the $TM_{00}$ mode since it receives the least energy of the true measurement signal. One important objective of the dielectric loading hereof is to position a minimum in the spurious standing wave field pattern at the farthest receiver by loading of selected dielectric materials within the sonde, thus reducing the parasitic signal at the farthest receiver.

To initially illustrate the principle of the invention, consider first the example of FIGS. 3-6 which shows the effect, in a simplified case, of filling the device with a single type of dielectric material. In this example, the antenna spacings in FIGS. 3 and 5 have been chosen such that the distance between T and end cap 35 and between R4 and end cap 34 are both one-quarter of the device length. The device of FIG. 3 is air filled and the device of FIG. 5 is filled with a dielectric material. Since the axial current is proportional to the magnetic field, one can determine the choice of dielectric for the FIG. 5 device by considering the distribution of the axial current on the center pipe 37 of the device. In FIG. 4 there is shown the magnitude of the axial current on the center pipe in the case of the air-filled device of FIG. 3. At the ends of the cavity model the center pipe is shorted to the outer wall (e.g. the conductive mud) of the cavity, and therefore the boundary conditions at the cavity ends force the current to be a local maximum (or minimum) at these points. As we move away from each end, toward the inside of the cavity, the current amplitude will oscillate spatially as a cosine. The wavelength of the oscillation for the primary transverse magnetic mode corresponds to the wavelength, $\lambda_{TM00}$, for $TM_{00}$ mode at the operating frequency (for example, 25 MHz). $\lambda_{TM00}$ is very close to the wavelength of free electromagnetic waves in the dielectric medium filling the device, $\lambda_{vac.}/\sqrt{\epsilon}$, where $\epsilon$ is the dielectric constant. For an air-filled device $\epsilon = 1$ and $\lambda_{TM00}$ is approximately the free space wavelength at the operating frequency, for example 12 meters at 25 MHz. This is approximately three times the length (about four meters) of an operational model of the logging device disclosed in above referenced U.S. Pat. No. 4,209,747. Therefore, for a device such as the stated operational model, the current pattern will oscillate at this wavelength (from both ends) until it reaches the transmitter where the wave amplitude from either end of the sonde must be equal. From the example of FIG. 3 it is seen that (in the case where the device is air filled) the current at the farthest receiver will generally not be much smaller than its maximum value, since R4 is only a small fraction of a wavelength from its respective end of the device. Therefore the TM mode parasitic signal at R4 is very substantial for the case of an air filled device at the length and operating frequency given in this example. This is an undesireable effect since, as noted above, R4 is the farthest receiver and receives the weakest logging signal.

A solution to this problem in accordance with the invention, and as illustrated in FIGS. 5 and 6, is to change the wavelength $\lambda_{TM00}$ so that the distance from R4 to its respective end of the device is a quarter wave, i.e. in this example we want $\lambda_{TM00}$ to be four meters. From the relationship set forth above, this means $\sqrt{\epsilon}$ should equal 3. The situation is depicted schematically in FIG. 5, and the resulting current distribution is shown in FIG. 6. This distribution can be qualitatively understood in the same way as above, bearing in mind that $\lambda_{TM00}$ has been reduced to one-third of its previous length, thereby producing more rapid oscillations of the current amplitude pattern. Thus, by employing selective dielectric loading, one can effectively "position" the most sensitive receiver R4 (and, in this example, the transmitter T, as well) in current nulls inside the cavity. Accordingly, the coupling of the antennas to the $TM_{00}$ mode can be greatly reduced at R4 and T.

Departures from this somewhat idealized example stem from factors such as the mud not being a perfect conductor, and actual antenna spacings varying in different devices. Variations in antenna spacings can be accounted for (particularly when attempting to achieve approximate minima at other antennas as well as at the farthest antenna) by using different dielectric materials to load different portions of the device.

Figure 7:
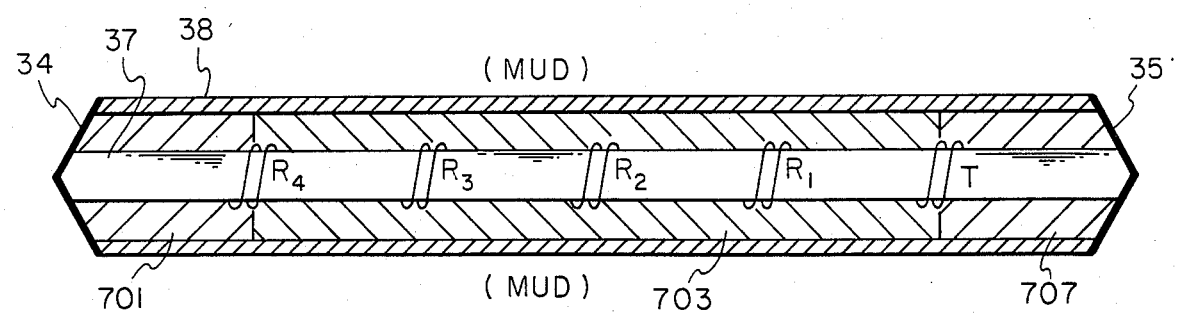
FIG. 7 shows a simplified model of a deep propagation logging device loaded with dielectric materials in accordance with the principles of the invention.

Referring to FIG. 7, there is shown a model of a deep propagation type of logging device having antenna spacings as illustrated in the FIGURE. Each of the antennas is assumed to be shielded (not shown), as in FIG. 2. The region 701, between R4 and end cap 34, and the region 702, between T and end cap 35, are assumed to be filled with a dielectric of $\epsilon=36$. The region 703, between T and R4, is assumed to be filled with a slightly lossy dielectric having $\epsilon=2$ and $\rho=10$ ohm meters. The value $\epsilon=36$ is chosen for the end regions so as to "fit" a quarter wavelength (at the operating frequency) between R4 and its respective end cap and between T and its respective end cap. The smaller value for $\epsilon$ is used in the center regions so as to minimize oscillations, and the loss is included to add damping to any spurious mode at R4.

Figure 8:
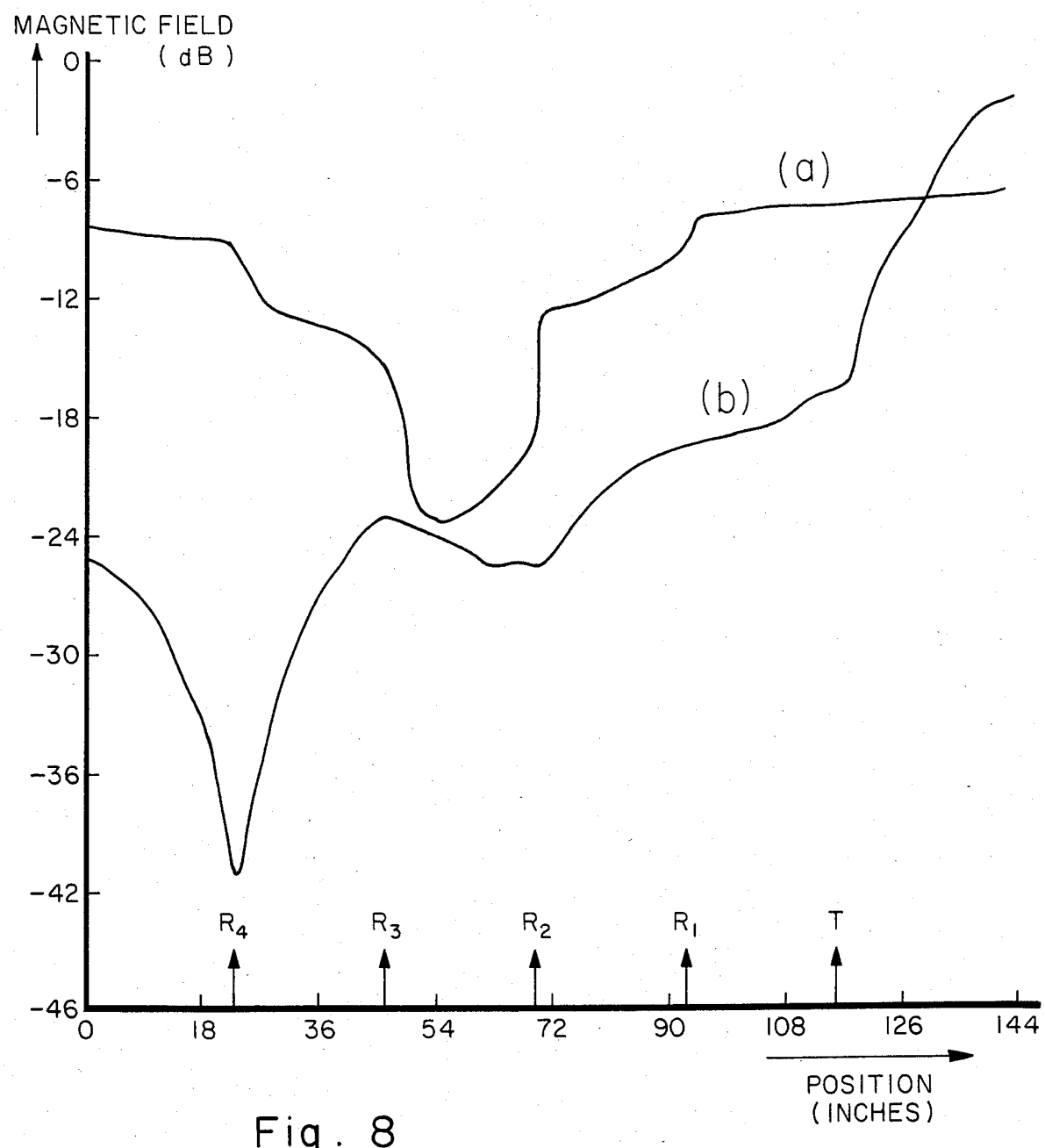
FIG. 8 shows graphs of azimuthal magnetic field due to a mode of transverse magnetic electromagnetic energy in the FIG. 7 device.

FIG. 8 shows the calculated azimuthal magnetic field due to the $TM_{00}$ mode inside the device of FIG. 7 for two cases. The curve (a) is for an air-filled device, and the curve (b) is for a device loaded with dielectric materials having the values set forth in the previous paragraph. It is seen that the dielectric loading results in a substantial reduction of spurious $TM_{00}$ signal at each antenna position, with a dramatic reduction at the farthest receiver R4.

At the present time, applicant is unaware of a suitable dielectric material, which has relative electrical stability at high temperature and pressure, and a dielectric constant of $\epsilon=36$. However, the dielectric material called STYCAST-HI K, sold by Emerson & Cuming, has a dielectric constant of 30, and can be used.

The invention has been described with reference to particular embodiments, but variations within the spirit and scope of the invention will occur to those skilled in the art. For example, it will be understood that the number, form, and spacing of the antennas may be different from those illustrated. Also, although it can involve certain trade-offs (particularly where the geometry is not ideal) to load a device with a single type of dielectric material, this may be advantageous in some cases.

I claim:

1. A borehole logging device, comprising:
   an elongated body suspendable in a borehole and having at least one transmitting antenna and at least one receiving antenna mounted in spaced relation therein;
   means for applying energizing signals to said transmitting antenna to produce electromagnetic energy, a portion of which is received at said antenna after being affected by earth formations surrounding the borehole, said energizing signals also creating spurious transverse magnetic mode components of standing wave electromagnetic energy within said body;
   a region of said body being loaded with dielectric material having a dielectric constant selected to adjust the wavelength of said transverse magnetic mode components of standing wave electromagnetic energy such that said standing wave has substantially a minimum amplitude at said receiving antenna.

2. A borehole logging device, comprising:
   an elongated body, including an elongated central conductor and radially extending conductive end caps;
   at least one transmitting antenna and at least one receiving antenna mounted in spaced relation in said body;
   means for applying energizing signals to said transmitting antenna to produce electromagnetic energy, a portion of which is received at said receiving antenna after passing through earth formations surrounding a borehole, said energizing signals also creating spurious transverse magnetic mode components of standing wave electromagnetic energy within said body;
   a dielectric material disposed in said body in the region between said at least one receiving antenna and the end cap closest thereto, said dielectric material having a dielectric constant selected to adjust the wavelength of said transverse magnetic mode components of standing wave electromagnetic energy such that said standing wave has substantially a minimum amplitude at said receiving antenna.

3. Apparatus as defined by claim 2, wherein said wavelength is adjusted to be about four times the distance between said receiving antenna and the end cap closest thereto.

4. Apparatus as defined by claim 2, wherein said dielectric constant is greater than about 20.

5. Apparatus as defined by claim 3, wherein said dielectric constant is greater than about 20.

6. Apparatus as defined by claim 2, further comprising a second dielectric material disposed in the region between said transmitting antenna and said receiving antenna, said second dielectric material having a lower dielectric constant than said first mentioned dielectric constant.

7. Apparatus as defined by claim 3, further comprising a second dielectric material disposed in the region between said transmitting antenna and said receiving antenna, said second dielectric material having a lower dielectric constant than said first mentioned dielectric constant.

8. Apparatus as defined by claim 6, wherein said second dielectric material is substantially lossier than said first-mentioned dielectric material.

9. Apparatus as defined by claim 6, wherein said second dielectric material is substantially lossier than said first-mentioned dielectric material and has a lower dielectric constant than said first-mentioned dielectric material.

10. Apparatus as defined by claim 2, further comprising a dielectric material disposed in the region between said transmitting antenna and the end cap closest thereto.

11. Apparatus as defined by claim 9, further comprising a dielectric material disposed in the region between said transmitting antenna and the end cap closest thereto.

12. A borehole logging device, comprising:
an elongated body, including an elongated central conductor and radially extending conductive end caps;
a transmitting antenna and four receiving antenna mounted in spaced relation in said body;
means for applying energizing signals to said transmitting antenna to produce electromagnetic energy, portions of which are received at said receiving antennas after passing through earth formations surround the borehole, said energizing signals also creating spurious transverse magnetic mode components of standing wave electromagnetic energy within said body; and
a dielectric material disposed in said body in the region between the receiving antenna farthest from the transmitter and the end cap closest to said farthest receiving antenna, said dielectric material having a dielectric constant selected to adjust the wavelength of said transverse magnetic mode components of standing wave electromagnetic energy such that said standing wave has substantially a minimum amplitude at said farthest receiving antenna.

13. Apparatus as defined by claim 12 wherein said wavelength is adjusted to be about four times the distance between said farthest receiving antenna and the end cap closest thereto.

14. Apparatus as defined by claim 12, further comprising a dielectric material disposed said body in the region between said transmitting antenna and the end cap closest thereto, the dielectric constant of the dielectric material in the region between said transmitting antenna and the end cap closest thereto being selected to adjust the wavelength of said transverse magnetic mode components of standing wave electromagnetic energy therein such that said standing wave has substantially a minimum amplitude at said transmitting antenna.

15. Apparatus as defined by claim 13, further comprising a dielectric material disposed in said body in the region between said transmitting antenna and the end cap closest thereto, the dielectric constant of the dielectric material in the region between said transmitting antenna and the end cap closest thereto being selected to adjust the wavelength of said transverse magnetic mode components of standing wave electromagnetic energy therein such that said standing wave has substantially a minimum amplitude at said transmitting antenna.

16. Apparatus as defined by claim 14 wherein said dielectric material in the region between said transmitting antenna and the end cap closest thereto has a dielectric constant selected to adjust said wavelength therein to be about four times the distance between said transmitting antenna and the end cap closest thereto.

17. Apparatus as defined by claim 16 further comprising additional dielectric material disposed in the region between said transmitting antenna and said farthest receiving antenna, said additional dielectric material having a lower dielectric constant than the previously mentioned dielectric materials.

18. Apparatus as defined by claim 17 wherein said additional dielectric material is substantially lossier than the previously mentioned dielectric materials.

19. Apparatus as defined by claim 12 wherein the distance between said farthest receiving antenna and the end cap closest thereto is about one-half meter, the frequency of said energizing means is about 25 MHz, and the dielectric constant of the dielectric material in the region between said farthest receiving antenna and the end cap closest thereto is at least about 30.

20. Apparatus as defined by claim 19 wherein the distance between said transmitting antenna and the end cap closest thereto is about one-half meter, and the dielectric constant of the dielectric material in the region between said transmitting antenna and said end cap closest thereto is at least about 30.

21. Apparatus as defined by claim 20 wherein the region between said transmitting antenna and said farthest receiving antenna is filled with a lossy dielectric material having a dielectric constant that is less than the dielectric constant of the dielectric material in the region between said farthest receiving antenna and the end cap closest thereto.

* * * * *